May 18, 1937.  C. F. RENSCH  2,080,953
INSTRUMENT FOR INDICATING FOREIGN MATTER IN GASES
Filed May 28, 1935
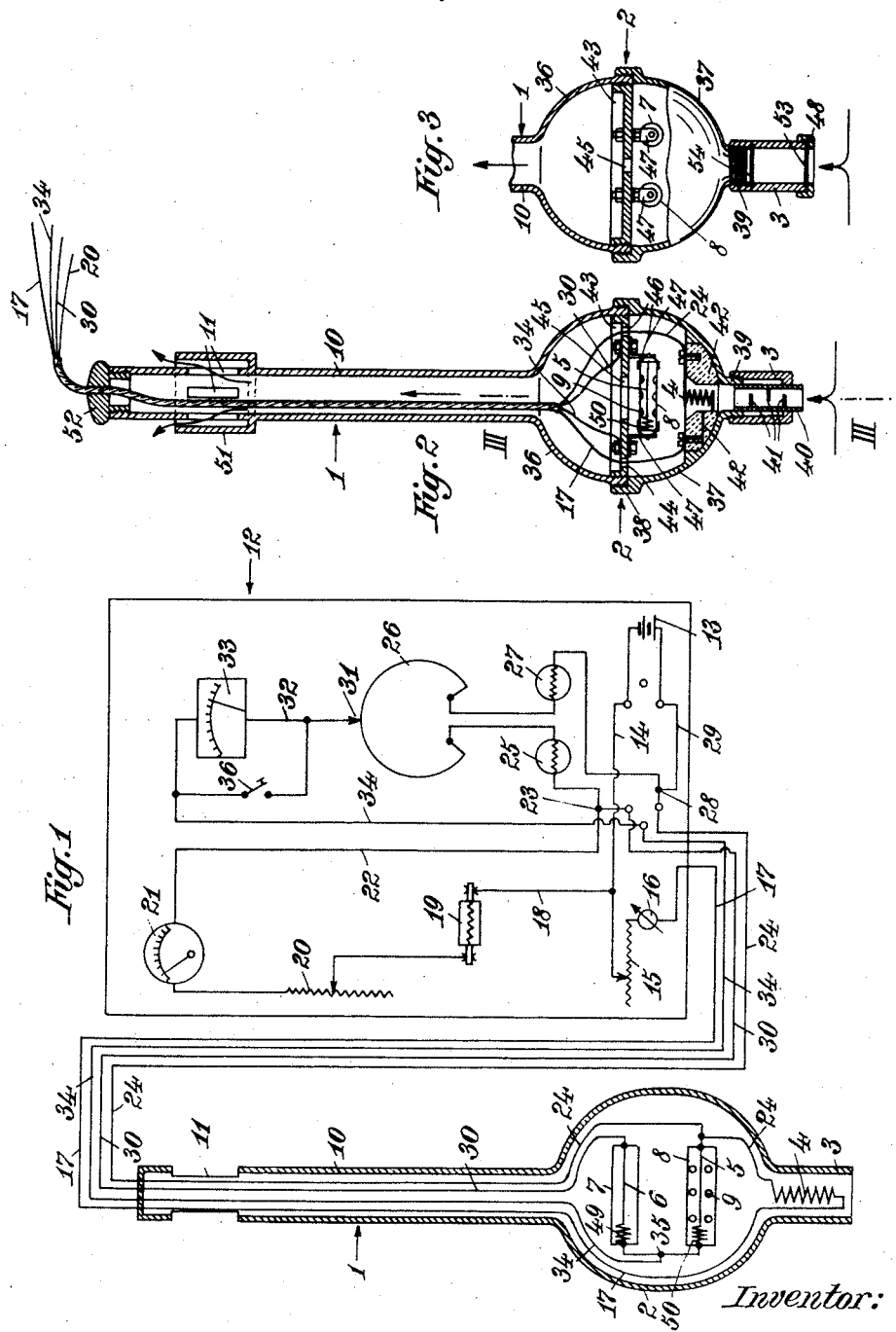
Inventor:
Carl Friedrich Rensch
Attorneys:
Bailey & Larson Patented May 18, 1937

2,080,953

UNITED STATES PATENT OFFICE 2,080,953

INSTRUMENT FOR INDICATING FOREIGN MATTER IN GASES

Carl Friedrich Rensch, Berlin-Wilmersdorf, Germany

Application May 28, 1935, Serial No. 23,959
In Germany June 1, 1934

17 Claims. (Cl. 73—51)

My invention relates to instruments for indicating foreign matter in gases.

It is an object of my invention to provide a simple and reliable instrument for the purpose specified which indicates not only foreign matter in the shape of gas but also in the shape of liquid globules, and of dust.

With this object, I equip the instrument with a detector wire of palladium-silver alloy whose surface is large as compared with its cross section, and I provide means for heating the wire, and means for establishing a flow of test gas about it.

It is known that certain metals, such as platinum, palladium, iridium, absorb or adsorb hydrogen whereby the electric resistance of such metals is increased. Absorption or adsorption of hydrogen occurs at normal temperature but is more intense at elevated temperature.

The absorbing or adsorbing capacity of such metals is utilized in suitable instruments for indicating the presence of hydrogen in mixtures of gases. The instruments comprise substantially a detector wire, or wires, of circular cross-section, which may be of platinum, palladium, or iridium, and means such as a Wheatstone bridge for measuring the resistance of the wire, or wires.

I have found that if the detector wire is made of palladium-silver alloy, say, at the rate of 70% of palladium and 30% of silver, not only hydrogen but also other gases and non-gaseous foreign matter in the test gas, for instance, globules of liquid or dust, produce an increase of the resistance in the wire. As the sensibility of indicating instruments is increased by making the surface of the detector wire large as compared with its cross-section, the detector wire is either made round and very thin, or spread out into a very thin foil, so that its surface becomes a maximum.

The detector wire is heated, preferably to about 85° C., and it has been found that the sensibility of the instrument is much increased and the presence of very small amounts of foreign matter is indicated, if the test gas is heated as well as the detector wire, and preferably to the temperature of the wire. The percentage of gaseous or other foreign matter in the gas is ascertained from the periods within which the resistance varies, and from the amount of the variations, as indicated by the deflection of a pointer. From these data, the percentage of foreign matter is ascertained. The exactitude of the indications is increased by heating the test gas, as described.

The absorption and adsorption capacity of the detector wire is a function of its temperature which should be kept as uniform as possible. The temperature of the detector wire is equal to the temperature of the test gas plus the difference between the temperature of the detector wire and the temperature of the gas. For instance, if the detector wire is heated to 110° C. by a heating current, and the temperature of the gas is 25° C., the temperature difference is 85° C. If, with the same temperature of the detector wire the gas temperature is 85° C., the difference is only 25° C. To keep the temperature of the detector wire constant, the temperature of the gas and the difference must be constant. It is easy to obtain a constant temperature of the gas by means of a heating coil or the like which is regulated. However, the difference cannot be regulated as it is a function of the heat conductivity and the flow velocity of the gas. In order to reduce the influence of the temperature difference on the temperature of the detector wire, the gas is heated to so high a temperature that the difference required for heating the wire to the desired temperature, is quite small. Thus, if the gas is heated to 85° C., and the temperature of the wire is 100° C., the difference is only 15°, and a variation of the temperature difference has little influence on the temperature of the wire. For instance, if the temperature difference of 15° C. is considered, and the difference varies for ⅓, the influence of this variation is only 5%.

In the accompanying drawing, an instrument embodying my invention is illustrated more or less diagrammatically by way of example.

In the drawing

Fig. 1 is a diagrammatic and partly sectional elevation of the complete instrument, Fig. 2 is an axial section of the casing in which the detector wire is housed, and Fig. 3 shows the lower portion of Fig. 2, slightly modified and partly in section on the line III—III in Fig. 2.

Referring now to the drawing, and first to Fig. 1, the instrument comprises a detector unit 1, and an indicator unit 12. The indicator unit is equipped with a source of electric energy which may be a storage or other battery 13, and with an indicator 33 in combination with a Wheatstone bridge, as will be described.

The detector unit 1 has a casing 2 which may be of hard rubber, bakelite, or some other material which is inert to the test gas. The casing 2 comprises an inlet pipe 3 at the lower end of a globular body, and a flue 10 at upper end of the body, with ports 11 for the escape of the test gas.

The test gas, for instance, atmospheric air, is admitted at the lower end of inlet pipe 3 and heated by a coil 4 in the pipe. The coil is supplied with current from the battery 13 through a wire 14, a regulating resistance 15, an ammeter 16, and a wire 17, and is connected to the other terminal of the battery by a wire 24 which is connected to a wire 29 at one terminal of the Wheatstone bridge.

Mounted in the body of detector casing 2 are a detector wire 5, of palladium-silver alloy, the term "wire" including a very thin round wire as well as a very thin flat foil rolled from a wire; and a comparison wire 6 of a material which has the same temperature coefficient of resistance as the alloy, or the comparison wire may be made of the same alloy as the detector wire. A closed tube 7 of glass or other inert material protects the comparison wire 6 from the test gas. To prevent bending of the comparison wire by heat, it is connected to a weak coiled spring 49 at one end. A similar tube 8 is provided for the detector wire 5 but has openings 9 to admit the test gas to the detector wire. The wire 5 is supported at one end by a weak spring 50 which corresponds to the spring 49 of the comparison wire 6. The wires are connected to the respective coiled springs by a solder containing 75% of tin, 12–8% of bismuth, and 7–5% of antimony. The wire 5 is part of the Wheatstone bridge, and is connected to its terminal 35. By enclosing both wires in the glass tubes 7 and 8, substantially uniform test conditions are provided for both wires.

The test gas is heated by the coil 4 and flows to the flue 10 through whose ports 11 it escapes. The heat delivered to the test gas by the coil 4 and the heated wires 5 and 6 produces considerable draft and therefore non-flowing gas, such as atmospheric air, and gas which is heavier than air, is drawn into the casing in continuous flow.

The connections to the indicator unit are introduced through the flue 10. The circuit of the heating coil 4 has already been described. A wire 18 is connected to this circuit at one end, and its other end is connected to an iron-hydrogen resistance 19 by which the current is maintained constant. The resistance 19 is connected to the terminal 23 of the Wheatstone bridge which is opposite the terminal 28, through a regulating resistance 20, an ammeter 21 and a wire 22. From terminal 23, the current flows, on the one hand, to terminal 28 through an invariable resistance 25, a potentiometer 26 and another invariable resistance 27, and, on the other hand, to the same terminal 28 through wire 30, comparison wire 6, the third terminal 35 of the Wheatstone bridge, through detector wire 5 and wire 24. 31 is a slip contact on the potentiometer 26. This contact is the fourth terminal of the Wheatstone bridge and is connected to one terminal of indicator 33 through a wire 32. The other terminal of the indicator is connected to the third terminal 35 of the Wheatstone bridge through wire 34. A switch 36 is provided for short-circuiting the indicator 33 to balance the Wheatstone bridge in the usual manner.

The operation of the instrument is as follows:
The current supplied to the detector and comparison wires 5 and 6 is regulated by the resistance 20 to heat the two wires to the same temperature, say, 85° C. Thereupon current is supplied to the heating coil 4 through the regulating resistance 15 by which the heating coil 4 is heated to about the same temperature as the wires 5 and 6. The slip contact 31 of potentiometer 26 is shifted for compensating the Wheatstone bridge. The bridge remains in this condition while the test gas, for instance, atmospheric air, is pure. If, however, the air contains foreign matter, the resistance of detector wire 5 is increased, the bridge becomes unbalanced, and the pointer of indicator 33 is deflected. The amount of the deflection is a measure for the percentage of foreign matter in the tested air. As mentioned, the instrument also responds to liquid or solid substances suspended in the air, such as globules of liquid, or dust. The percentage of such non-gaseous bodies is indicated in a similar manner as the percentage of gaseous impurities.

The detector unit 1 will now be described in detail with reference to Figs. 2 and 3.

Referring first to Fig. 2, the globular portion of the casing 2 is subdivided into an upper portion 36 which is integral with the flue 10, and a lower portion 37 which is connected to the threaded lower end of portion 36 by a threaded annulus 38. At its lower end, the lower portion 37 has a hollow threaded nipple 39 on which the inlet pipe 3 is screwed. A pipe 40, with baffles 41, is inserted in the pipe 3.

The heating coil 4 is supported by a pair of insulating blocks 42 above the nipple 39. The detector and comparison wires 5 and 6 are supported by a partition 43 which is inserted at the lower end of the upper portion 36 by a threaded flange, and has a central air passage 45 and holes 44 and 46 for the wires 17 and 24, respectively. The four wires which connect the detector unit to the indicating unit, are inserted together in a sheath in the flue 10. The detector and comparison wires 5 and 6 are each supported by a pair of brackets 47 engaging metal cups at the ends of the corresponding tube 7 or 8. The wires 30 and 34 are connected to the brackets 47. By these means, the comparison and detector wires are supported at the lower side of partition 43, as shown in Fig. 3.

The ports 11 in the flue 10 are surrounded by a jacket 51 which surrounds the flue in spaced relation and is open at the top while its bottom is integral with the wall of the flue. A plug 52 is threaded into the upper end of the flue for closing it, and the plug is bored for the sheath in which the wires are inserted.

The baffles 41 and the jacket 51 prevent surging of the test gas if a flowing gas is tested, for instance, if the detector unit 1 is suspended in the open air. By these means blasts of wind are intercepted at the upper and lower ends of the detector unit and the conditions under which the air has access to the casing 2, are maintained uniform so that the flow through the casing is not disturbed.

Means (not shown) may also be provided for eliminating the influence of temperature variations on the flow in the casing.

Referring now to Fig. 3, the inlet pipe 3 is equipped with a cap nut 48 at its lower end which supports a screen 53, and another screen 54 is inserted just below the lower end of nipple 39. The function of the screens 53 and 54 is the same as the function of the baffles 41 in the tube 40, Fig. 2. Otherwise, the casing illustrated in Fig. 3 may be quite similar to that illustrated in Fig. 2.

I am not limited to the particular designs of the casing 2 which have been shown and described by way of example, nor am I limited to a casing which has the means inserted in the inlet pipe 3, and the jacket 51.

I claim:

1. In an instrument for indicating foreign matter in gases, a detector member of palladium-silver alloy whose surface is large as compared with its cross section, means for heating the member, and means for establishing a flow of test gas about the member.

2. In an instrument for indicating foreign matter in gases, a detector member whose surface is large as compared with its cross section, means for heating the member, means for establishing a flow of test gas about the member, and means for pre-heating the test gas substantially to the temperature of the member.

3. In an instrument for indicating foreign matter in gases, a detector member whose surface is large as compared with its cross section, a tube of inert material surrounding the detector member and having an opening for the access of the test gas to said detector member, a comparison member of a material whose temperature coefficient of resistance is equal to that of said member, a closed tube of inert material surrounding the comparison member, means for heating said detector member and said comparison member, and means for establishing a flow of test gas through the tube surrounding the detector member, and about the tube surrounding the comparison member, and means for pre-heating the test gas substantially to the temperature of said member.

4. In an instrument for indicating foreign matter in gases, a casing of inert material having openings therein for the passage of a flow of test gas through said casing, a detector member of palladium-silver alloy whose surface is large as compared with its cross section, and which is arranged in the casing, means for heating the member, and means arranged in the casing for pre-heating the test gas so as to establish a flow of heated test gas through the casing and about the member.

5. In an instrument for indicating foreign matter in gases, a casing of inert material for the reception of flowing test gas, a detector member whose surface is large as compared with its cross section, and which is arranged in the casing, means for heating the member, means arranged in the casing for pre-heating the test gas substantially to the temperature of said member and to establish a flow of heated test gas through the casing and about the member, and means for preventing surging of the test gas as it flows in the casing.

6. In an instrument for indicating foreign matter in gases, a vertical casing of inert material for the reception of flowing test gas, a flue at the upper end of the casing, a gas-inlet pipe at the lower end of the casing, a heating coil in the inlet pipe, a detector member whose surface is large as compared with its cross section, and which is arranged in the casing, a circuit for heating the coil, and a circuit for heating the detector member.

7. In an instrument for indicating foreign matter in gases, a vertical casing of inert material for the reception of flowing test gas, a flue at the upper end of the casing, a gas-inlet pipe at the lower end of the casing, a pipe inserted in the gas-inlet pipe, baffles in the inserted pipe, a heating coil in said casing in alignment with said inserted pipe, a detector member whose surface is large as compared with its cross section, and which is arranged in the casing, a circuit for heating the coil, and another circuit for heating said detector member.

8. In an instrument for indicating foreign matter in gases, a vertical casing of inert material for the reception of flowing test gas, a flue at the upper end of the casing, a gas-inlet pipe at the lower end of the casing, a screen in the pipe, a heating coil in said casing in alignment with said pipe, a detector member whose surface is large as compared with its cross section, and which is arranged in the casing, a circuit for heating the coil, and another circuit for heating said detector member.

9. In an instrument for indicating foreign matter in gases, a vertical casing of inert material for the reception of flowing test gas, a flue at the upper end of the casing, with a port for the escape of the test gas, a jacket which is open at the top and closed at the bottom and surrounds the flue in spaced relation in the region of the port, a gas-inlet passage at the lower end of the casing, a heating coil in the inlet passage, a detector member whose surface is large as compared with its cross section, and which is arranged in the casing, a circuit for heating the coil, and another circuit for heating the detector member.

10. In an instrument for indicating foreign matter in gases, a divided vertical casing of inert material for the reception of flowing test gas, comprising an upper and a lower portion, means for detachably connecting the two portions, a flue at the upper end of the upper portion, a partition having a hole and detachably inserted in the lower end of the upper portion, a detector member whose surface is large as compared with its cross section, a comparison member of a material whose temperature coefficient of resistance is equal to that of said member, a casing completely enclosing said comparison member, brackets secured to the partition for supporting the two members, a gas-inlet passage at the lower end of the lower portion, a heating coil in the lower part of said lower portion of the casing in alignment with said passage, a circuit for heating the coil, another circuit for heating the detector member, electric indicating means connected to the circuit of the detector member, and means at the inlet passage and the flue, for equalizing the flow of test gas through said casing.

11. In an instrument for indicating foreign matter in gases, a casing of inert material, means on said casing for establishing a flow of test gases, a detector member whose surface is large as compared with its cross section, and which is arranged in said casing, a comparison member of a material whose temperature coefficient of resistance is equal to that of said detector member, means for heating said detector member, means for heating said comparison member, and means for preheating the test gases substantially to the temperature of said detector member.

12. In an instrument for indicating foreign matter in gases, a vertical casing of inert material, a flue at the upper end of the casing having slots near its upper end, a jacket closed at its bottom and open at its upper end surrounding said flue and said slots in spaced relation thereto, a gas inlet socket at the lower end of the casing, said flue and said socket establishing a flow of test gas through said casing, a heating coil in the inlet socket, a detector member whose surface is large as compared with its cross section, and which is arranged in the casing, a circuit for heating the coil, and a circuit for heating the detector member.

13. In an instrument for indicating foreign matter in gases, a vertical casing of inert material, a flue at the upper end of the casing having slots near its upper end, a jacket closed at its bottom and open at its upper end surrounding said flue and said slots in spaced relation thereto, a gas inlet socket at the lower end of the casing, said flue and said socket establishing a flow of test gas through said casing, a pipe inserted in said gas inlet socket, baffles in said pipe, a heating coil in said casing in alignment with said pipe, a detector member whose surface is large as compared with its cross section, and which is arranged in the casing, a circuit for heating the coil, and a circuit for heating the detector member.

14. In an instrument for indicating foreign matter in gases, a vertical casing of inert material, a flue at the upper end of the casing having slots near its upper end, a jacket closed at its bottom and open at its upper end surrounding said flue and said slots in spaced relation thereto, a gas inlet socket at the lower end of the casing, said flue and said socket establishing a flow of test gas through said casing, a pipe connected to said socket, a screen in said pipe, a heating coil in said casing in alignment with said socket, a detector member whose surface is large as compared with its cross section, and which is arranged in the casing, a circuit for heating the coil, and a circuit for heating the detector member.

15. In an instrument for indicating foreign matter in gases, a casing of inert material, a flue at the upper part of said casing having slots near its upper end, a jacket, closed at its bottom and open at its upper end, surrounding said flue in spaced relation in the region of the slots, a socket at the lower part of said casing, said flue and said socket serving the purpose of establishing the flow of gas through said casing, a heating coil arranged in said socket for heating the gas to a predetermined temperature and for enhancing the flow of the gas, a detector member whose surface is large as compared with its cross section, and which is arranged in said casing, and means for heating said detector member to a temperature higher than that of the test gas entering said casing.

16. In an instrument for indicating foreign matter in gases, a detector member of palladium-silver alloy.

17. In an instrument for indicating foreign matter in gases, a detector member of palladium-silver alloy and means for heating said member.

CARL FRIEDRICH RENSCH.